No. 747,328. PATENTED DEC. 15, 1903.
W. OWEN.
MACHINE FOR SHAPING AND PRESSING PLASTIC MATERIAL.
APPLICATION FILED DEC. 5, 1902.
NO MODEL. 3 SHEETS—SHEET 2.

Witnesses.

Inventor.

No. 747,328. PATENTED DEC. 15, 1903.
W. OWEN.
MACHINE FOR SHAPING AND PRESSING PLASTIC MATERIAL.
APPLICATION FILED DEC. 5, 1902.
NO MODEL. 3 SHEETS—SHEET 3.

No. 747,328. Patented December 15, 1903.

UNITED STATES PATENT OFFICE.

WILLIAM OWEN, OF WOKING, ENGLAND, ASSIGNOR OF ONE-HALF TO WILLIAM JOSEPH POUPORE, OF MONTREAL, CANADA.

MACHINE FOR SHAPING AND PRESSING PLASTIC MATERIAL.

SPECIFICATION forming part of Letters Patent No. 747,328, dated December 15, 1903.

Application filed December 5, 1902. Serial No. 134,028. (No model.)

*To all whom it may concern:*

Be it known that I, WILLIAM OWEN, of Woking, in the county of Surrey, England, have invented certain new and useful Improvements in Machines for Shaping and Pressing Plastic Material; and I hereby declare that the following is a full, clear, and exact description of the same.

This invention relates to a machine for shaping and pressing plastic material; and it relates more particularly to a machine especially designed for the manufacture of brick and like articles, the object of the invention being to so arrange the machine that the filling of the mold-boxes, the pressing and shaping of the material therein, and the ejecting and carrying away of the molded articles will be successively and continuously carried on.

In carrying out this object I employ a stationary table rigidly secured to a fixed support and revolubly mounted on the stationary table, a rotary table having a series of bottomless mold-apertures to receive the plastic material or to receive a corresponding number of bottomless mold-boxes, the rotary table being driven by a suitable mechanism coacting with the mechanism actuating the pressing and shaping plungers, which are placed in such relation to the mold-apertures that they will successively press and then eject the material therefrom.

Figure 1:
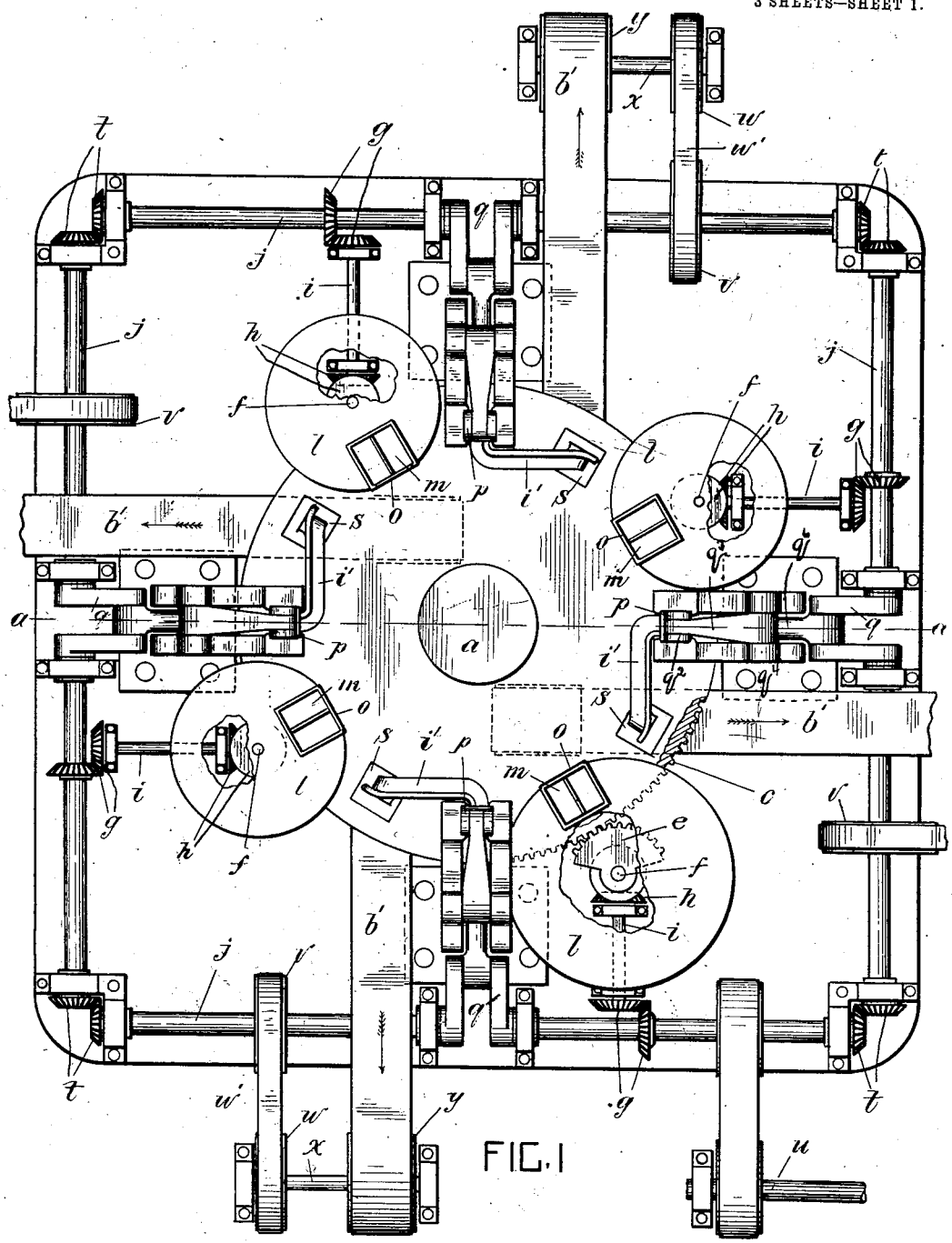
Figure 2:
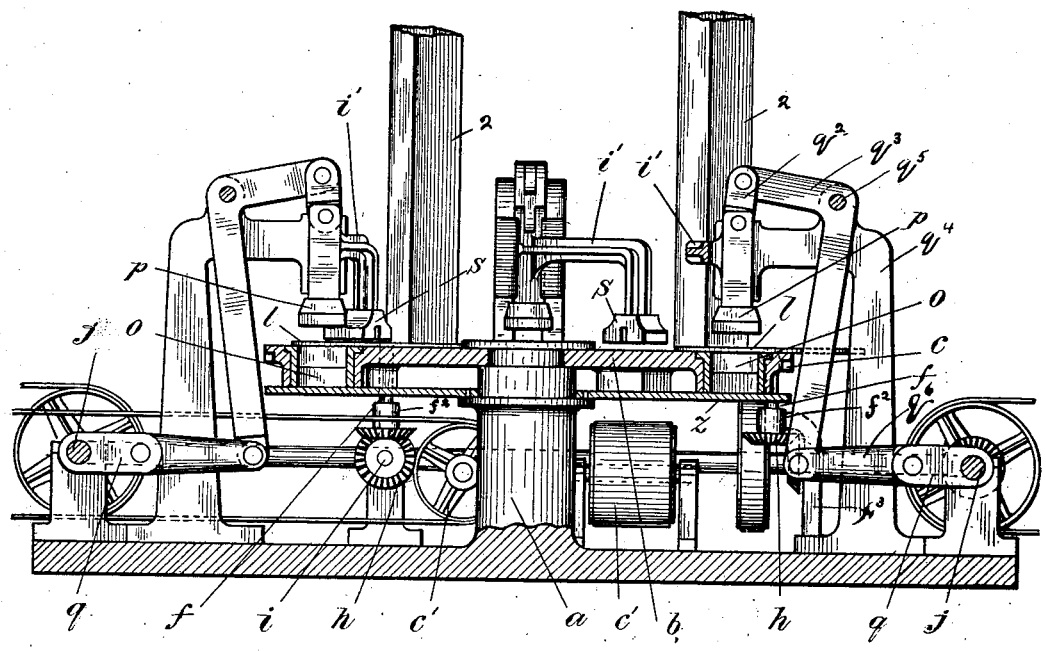
Figure 5:
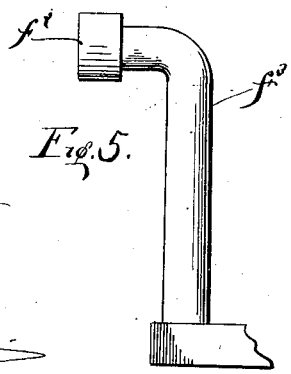
Figure 3:
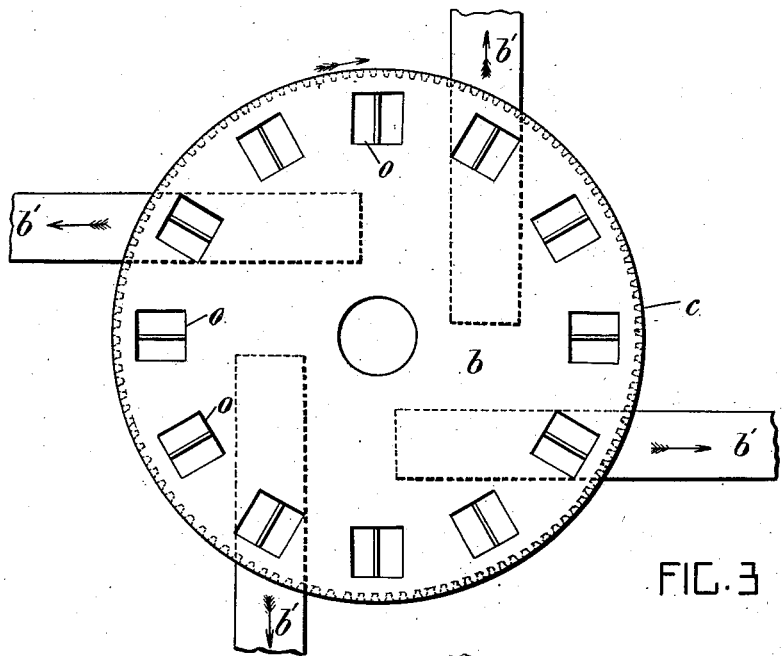
Figure 4:
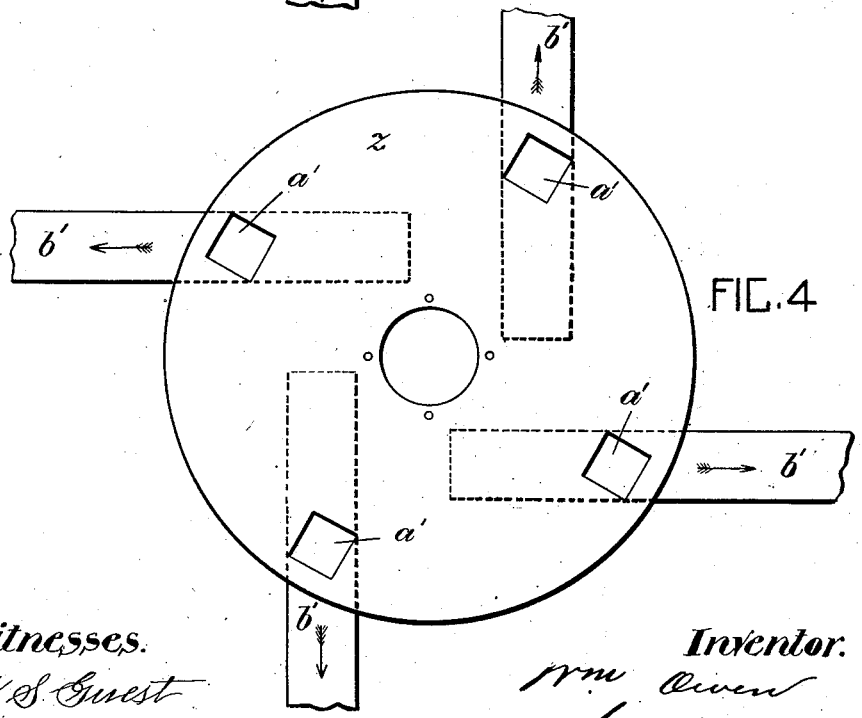

In the drawings, Figure 1 is a plan view of the entire machine. Fig. 2 is a sectional view on the lines $a\ a$ of Fig. 1. Fig. 3 is a plan view of the rotary table looking at it from the top. Fig. 4 is a plan view of the stationary table, showing the apertures through which the molded articles are ejected. Fig. 5 is a side elevation of one of the supports $f^3$.

Like characters of reference refer to like parts throughout the specification and drawings.

Revolubly mounted on a rigid standard $a$ is a rotary table $b$, fitted with a spur-wheel $c$, the teeth of which intermesh with the teeth of a toothed segment $e$, which is mounted on and revoluble with any one of the vertical shafts $f$, driven from the lever-operating shafts $j$ by means of the horizontal shafts $i$ and miter or bevel gear-wheels $g$ and $h$. During the rotation of the lever-operating shafts $j$ motion is transmitted to the vertical shaft $f$ by means of the shaft $i$ and miter or bevel gear-wheels $g$ and $h$ to cause the rotation of the toothed segment $e$, the teeth of which when intermeshing with the teeth of the spur-wheel $c$ impart a rotary motion to the table $b$. When the teeth of the toothed segment $e$ have disengaged themselves from the teeth of the spur-wheel $c$, the motion of the rotary tables is arrested until the teeth of the toothed segment have again engaged the teeth of the spur-wheel, when the motion of the spur-wheel and table is continued.

Mounted on the vertical shafts $f$, which are journaled in the bearings $f^2$, carried by the supports $f^3$ and rotatable with the shafts $f$, are rotary disks $l$, having apertures $m$, through which the mold-boxes $o$ in the rotary table $b$ are filled when such apertures and mold-boxes come into alinement with the spout 2 of the filling devices. (Not shown.)

Located above the rotary table $b$ are the pressing-plungers $p$, driven from the lever-operating shafts $j$ by cranks $q$, and projecting from the pressing-plungers $p$ are arms $i'$, fitted with the ejecting-plungers $s$, the pressing and ejecting plungers simultaneously entering the mold-apertures to respectively press the material in the mold-apertures opposed to the pressing-plungers and to eject the molded material from the mold-apertures opposed to the ejecting-plungers. The pressing-plungers $p$ are each connected through the medium of the links $q^2$ to the upper end of the bell-crank lever $q^3$, which is pivoted to the bracket $q^4$ at $q^5$, having its lower end connected by links $q^6$ to the crank $q$ of the operating-shafts $j$.

By reference to the drawings it will be noticed that the lever-operating shafts are fitted with intermeshing bevel or miter gear wheels $t$ to cause the united rotation of all of the lever-operating shafts, with the lever-operating shaft driven directly from the main counter-shaft $u$.

Mounted on the lever-operating shafts $j$ are drive-pulleys $v$, and opposed to the drive-pulleys $v$ are driven pulleys $w$, mounted on supplemental counter-shafts $x$, fitted with drive-pulleys $y$.

Located below the rotary table $b$ and forming a bottom for the mold-apertures is a stationary table $z$, having apertures $a'$, opposed to the ejecting-plungers $s$, through which the ejecting-plungers deliver the molded articles to the carrier-belts $b'$, passing around the drive-pulleys $y$ and drums $c'$, located below the stationary table $z$.

The motion of the lever-operating shaft $j$ is transmitted to the supplemental counter-shaft $x$ by means of belts $w'$, passing around the driven pulleys $v$ and $w$, the rotation of the supplemental counter-shafts $x$ causing the rotation of the carrier-belts $b'$ in the direction indicated by arrow to convey the molded articles from below the apertures in the fixed table and carry them to the delivery end of the conveyer.

From the foregoing description, taken in connection with the drawings, the operation of this machine is readily understood, but briefly stated is as follows: The material is placed within the mold-boxes $o$ through the medium of the spouts 2, and by means of the constantly-rotating shafts $j$ through the medium of the gears $g$ and $h$ the disks $l$ are operated, so as to cut off the supply of material from the spouts 2 to the mold-boxes and only supply the material thereto as the openings in the disks are in line with the mouth of the spouts and the mold-boxes. As the toothed segment $e$ is connected with the table $b$, the mold-boxes when filled are moved onward, so that each receives the corresponding pressing-plunger $p$, which is caused to move downward through the medium of the crank $q$ and connected mechanism, so as to press the material within its mold-boxes. As soon as the pressing operation has taken place and the pressing-plunger has been raised the compressed brick is ejected from the mold-boxes by the ejecting-plungers $s$. After the ejection of the brick the mold-boxes are conveyed below the disks $l$, and the openings at this time aline with the spouts 2, so that mold-boxes are again filled, so that with the construction shown in the drawings twenty-four bricks are made at each complete revolution of the table $b$.

Having thus fully described my invention, what I claim as new, and desire to secure by Letters Patent, is—

1. In a machine for pressing brick, the combination of a rotary table having a series of mold-apertures formed therethrough, a stationary table formed below and in contact with the rotary table having a series of apertures therethrough adapted to be in alinement with the apertures of the rotary table as the molded article is ejected from the mold, a series of rotary cut-off disks circumferentially arranged about the table adapted to control the flow of material to the molds, pressing and ejecting mechanism operated simultaneously so as to press the material in one mold and eject it in another simultaneously, and mechanism for revolving the table operating the rotary cut-off disks and the pressing and ejecting plungers.

2. In a molding-press, the combination of a base, a rigid standard mounted centrally thereof and projecting upward, a stationary table secured to and supported by said standard centrally thereof, said table being provided with a series of apertures therethrough, a rotary table journaled upon the upper end of said standard provided with a greater number of mold-apertures therethrough, a series of brackets mounted upon the base and depending over the rotary table, means pivoted in said brackets adapted to carry pressing and ejecting plungers, pressing and ejecting plungers connected to said means, and guided by the inner depending ends of said brackets, and mechanism for rotating the table and for operating the said plungers to press the material in the molds and eject it therefrom through the stationary table.

3. In a molding-press, the combination of a suitable support, a cylindrical standard rising centrally therefrom, a stationary table supported by said standard, a rotary table journaled upon the upper end of said standard above the stationary table, both of said tables being provided with mold-apertures therethrough, a series of vertical shafts mounted circumferentially of the rotary table, means connected with one of said shafts for actuating the rotary table, circular disks provided each with a feed-aperture mounted upon the upper end of said vertical shafts adapted to feed material to the apertures of the rotary table, a series of horizontal shafts journaled upon the support, and operably connected with the vertical shafts, pressing and ejecting mechanism operably connected with said horizontal shafts, and mechanism for operating the horizontal shafts.

4. In a molding-press, the combination of a suitable support, a cylindrical standard rising centrally therefrom, a stationary table supported by said standard, a rotary table journaled upon the upper end of said standard, both of said tables being provided with mold-apertures therethrough, a series of vertical shafts mounted without the periphery of the rotary table, means connected with one of said shafts for actuating the rotary table, circular disks provided each with a feed-aperture mounted upon the upper end of said vertical shafts adapted to feed material to the apertures of the rotary table, a series of horizontal shafts journaled upon the support, and operably connected with the vertical shafts, brackets supported upon and projecting above the support, pressing and ejecting mechanism adapted to be operably connected with the horizontal shafts mounted in said brackets, and mechanism for operating the horizontal shafts.

5. In a molding-press, the combination of a suitable support, a cylindrical standard rising centrally therefrom, a stationary table supported by said standard, a rotary table journaled upon the upper end of said standard above the stationary table, both of said tables being provided with mold-apertures, therethrough, a series of vertical shafts mounted without the periphery of the rotary table, means connected with one of said shafts for actuating the rotary table, circular disks provided each with a feed-aperture mounted upon the upper end of said vertical shafts adapted to feed material to the apertures of the rotary table, a series of horizontal shafts journaled upon the support, and operably connected with the vertical shafts, brackets carried by the support, bell-crank levers journaled in said brackets, pressing and ejecting devices carried upon the inner ends of said bell-crank levers, said bell-crank levers being operably connected with the horizontal shafts, and means for operating the horizontal shafts.

Toronto, November 19, 1902.

WILLIAM OWEN.

In presence of—
C. H. RICHES,
L. F. BROCK.